United States Patent
Han et al.

(10) Patent No.: US 11,688,403 B2
(45) Date of Patent: Jun. 27, 2023

(54) AUTHENTICATION METHOD AND APPARATUS WITH TRANSFORMATION MODEL

(71) Applicants: SAMSUNG ELECTRONICS CO., LTD., Suwon-si (KR); SNU R&DB FOUNDATION, Seoul (KR)

(72) Inventors: Seungju Han, Seoul (KR); Jaejoon Han, Seoul (KR); Minsu Ko, Suwon-si (KR); Chang Kyu Choi, Seongnam-si (KR); Bohyung Han, Seoul (KR)

(73) Assignees: Samsung Electronics Co., Ltd., Suwon-si (KR); SNU R&DB FOUNDATION, Seoul (KR)

(*) Notice: Subject to any disclaimer, the term of this patent is extended or adjusted under 35 U.S.C. 154(b) by 595 days.

(21) Appl. No.: 16/811,452

(22) Filed: Mar. 6, 2020

(65) Prior Publication Data
US 2020/0293886 A1    Sep. 17, 2020

(30) Foreign Application Priority Data
Mar. 15, 2019    (KR) .................. 10-2019-0030147

(51) Int. Cl.
*G10L 17/02*    (2013.01)
*G06N 3/08*    (2023.01)
(Continued)

(52) U.S. Cl.
CPC .............. *G10L 17/02* (2013.01); *G06F 18/00* (2023.01); *G06F 18/24* (2023.01); *G06F 21/36* (2013.01);
(Continued)

(58) Field of Classification Search
CPC ........ G06N 3/0454; G06N 3/08; G06N 7/005; G06N 20/10; G06F 21/36; G06F 21/45;
(Continued)

(56) References Cited

U.S. PATENT DOCUMENTS

| 8,363,906 B2 | 1/2013 | Iizuka |
| 9,373,047 B2 | 6/2016 | Aoki et al. |

(Continued)

FOREIGN PATENT DOCUMENTS

| JP | 2010-108365 A | 5/2010 |
| JP | 2013-196008 A | 9/2013 |

(Continued)

OTHER PUBLICATIONS

Multi-view Image Denoising Using Convolutional Neural Network—by Zhou (Year: 2019).*

*Primary Examiner* — Nimesh Patel
(74) *Attorney, Agent, or Firm* — NSIP Law

(57) ABSTRACT

An authentication method and apparatus using a transformation model are disclosed. The authentication method includes generating, at a first apparatus, a first enrolled feature based on a first feature extractor, obtaining a second enrolled feature to which the first enrolled feature is transformed, determining an input feature by extracting a feature from input data with a second feature extractor different from the first feature extractor, and performing an authentication based on the second enrolled feature and the input feature.

20 Claims, 12 Drawing Sheets

(51) Int. Cl.

| | | |
|---|---|---|
| *G10L 17/06* | (2013.01) | |
| *G10L 17/18* | (2013.01) | |
| *G10L 17/04* | (2013.01) | |
| *G06V 40/50* | (2022.01) | |
| *G06V 40/70* | (2022.01) | |
| *G06F 21/36* | (2013.01) | |
| *G06F 21/45* | (2013.01) | |
| *G06V 10/82* | (2022.01) | |
| *G06F 18/00* | (2023.01) | |
| *G06F 18/24* | (2023.01) | |
| *G06N 3/045* | (2023.01) | |
| *G06V 10/764* | (2022.01) | |

(52) U.S. Cl.
CPC ............. *G06F 21/45* (2013.01); *G06N 3/045* (2023.01); *G06N 3/08* (2013.01); *G06V 10/764* (2022.01); *G06V 10/82* (2022.01); *G06V 40/50* (2022.01); *G06V 40/70* (2022.01); *G10L 17/04* (2013.01); *G10L 17/06* (2013.01); *G10L 17/18* (2013.01)

(58) Field of Classification Search
CPC ...... G06F 21/32; G06F 21/31; G06F 21/6245; G06F 3/017; G06F 2221/2133; G06F 2203/012; G06F 2221/2139; G06K 9/62; G06K 9/6267; G06K 9/6292; G06K 9/6215; G06K 9/6201; G06K 9/6269; G06K 9/629; G06K 9/00523; G06V 10/82; G06V 40/50; G06V 40/70; G06V 10/764; G06V 40/172; G06V 40/168; G06V 40/161; G06V 40/171; G06V 40/16; G06V 40/166; G06V 40/10; G06V 10/431; G06V 10/809; G06V 40/15; G06V 40/174; G06V 20/52; G06V 40/23; G06V 40/25; G06V 10/10; G06V 10/70; G06V 10/42; G06V 10/44; G06V 10/40; G06V 20/48; G06V 20/653; G06V 40/1347; G06V 40/1365; G06V 40/165; G06V 40/162; G06V 40/173; G06V 40/18; G06V 40/394; G06V 40/40; G10L 17/02; G10L 17/04; G10L 17/06; G10L 17/18; G06Q 20/40145; G06Q 50/205; G06Q 20/206; G06Q 20/32; G06T 2207/30201; G06T 7/20; G06T 7/001; G06T 7/246; G06T 19/20; G06T 2207/20221; G06T 7/00
See application file for complete search history.

(56) References Cited

U.S. PATENT DOCUMENTS

| | | | |
|---|---|---|---|
| 2011/0135167 A1* | 6/2011 | Imaoka | G06K 9/6243 |
| | | | 382/118 |
| 2013/0266195 A1* | 10/2013 | Shiell | G06V 40/171 |
| | | | 382/118 |
| 2016/0371535 A1* | 12/2016 | Li | G06V 10/7515 |
| 2016/0379041 A1* | 12/2016 | Rhee | G06V 40/165 |
| | | | 382/118 |
| 2018/0276465 A1 | 9/2018 | Lee et al. | |

FOREIGN PATENT DOCUMENTS

| | | |
|---|---|---|
| JP | 2015-97000 A | 5/2015 |
| KR | 10-2010-0113651 A | 10/2010 |
| KR | 10-2016-0032466 A | 3/2016 |
| KR | 10-2016-0061856 A | 6/2016 |
| KR | 10-2018-0051742 A | 5/2018 |

* cited by examiner

AUTHENTICATION METHOD AND APPARATUS WITH TRANSFORMATION MODEL

CROSS-REFERENCE TO RELATED APPLICATIONS

This application claims the benefit under 35 USC § 119(a) of Korean Patent Application No. 10-2019-0030147 filed on Mar. 15, 2019 in the Korean Intellectual Property Office, the entire disclosure of which is incorporated herein by reference for all purposes.

BACKGROUND

1. Field

The following description relates to an authentication method and apparatus with a transformation model.

2. Description of Related Art

Technological automation of speech recognition has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization that generates a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor implemented authentication method includes obtaining a second enrolled feature to which a first enrolled feature generated based on a first feature extractor is transformed; determining an input feature by extracting a feature from input data with a second feature extractor different from the first feature extractor; and performing an authentication based on the second enrolled feature and the input feature.

The obtaining may include transforming the first enrolled feature to the second enrolled feature with a transformation model.

The obtaining may include receiving, from another apparatus, the second enrolled feature to which the first enrolled feature is transformed.

The second feature extractor may be an updated version of the first feature extractor.

The second enrolled feature may be obtained based on a transformation model.

The transformation model may include a structural element that corresponds to a difference between a structure of the first feature extractor and a structure of the second feature extractor.

The first feature extractor may be pretrained to output first output data in response to an input of first input data, the second feature extractor is pretrained to output second output data in response to an input of the first input data, and the transformation model is pretrained to output the second output data in response to an input of the first output data.

The first enrolled feature may include first sub-enrolled features, and the second enrolled feature includes second sub-enrolled features to which the first sub-enrolled features are transformed.

The method may include discarding at least a portion of the second sub-enrolled features based on suitabilities of the second sub-enrolled features.

The method may include discarding at least a portion of the second sub-enrolled features based on a similarity between the second sub-enrolled features.

The discarding may include discarding at least one of the second sub-enrolled features based on a second threshold and similarities between the at least one second sub-enrolled feature and remaining second sub-enrolled features.

The performing may include performing the authentication based on a first threshold and a similarity between the second enrolled feature and the input feature, wherein the first threshold is equal to the second threshold.

In a general aspect, an authentication apparatus includes one or more processors configured to obtain a second enrolled feature to which a first enrolled feature is transformed; determine an input feature by extracting a feature from input data with a second feature extractor different from the first feature extractor; and perform an authentication based on the second enrolled feature and the input feature.

The second enrolled feature may be obtained based on a transformation model.

The transformation model may include a structural element that corresponds to a difference between a structure of the first feature extractor and a structure of the second feature extractor.

The first feature extractor may be pretrained to output first output data in response to an input of first input data, the second feature extractor is pretrained to output second output data in response to an input of the first input data, and the transformation model is pretrained to output the second output data in response to an input of the first output data.

The first enrolled feature may include first sub-enrolled features, and the second enrolled feature includes second sub-enrolled features to which the first sub-enrolled features are transformed.

The one or more processors may be configured to discard at least a portion of the second sub-enrolled features based on a similarity between the second sub-enrolled features.

The one or more processors may be configured to discard one of the second sub-enrolled features based on a threshold and similarities between the one second sub-enrolled feature and the remaining second sub-enrolled features.

The apparatus may further include a memory storing instructions that, when executed by the one or more processors, configure the one or more processors to perform the generating of the first enrolled feature, the obtaining of the second enrolled feature, the determining of the input feature, and the performing of the authentication.

Other features and aspects will be apparent from the following detailed description, the drawings, and the claims.

Figure 1:
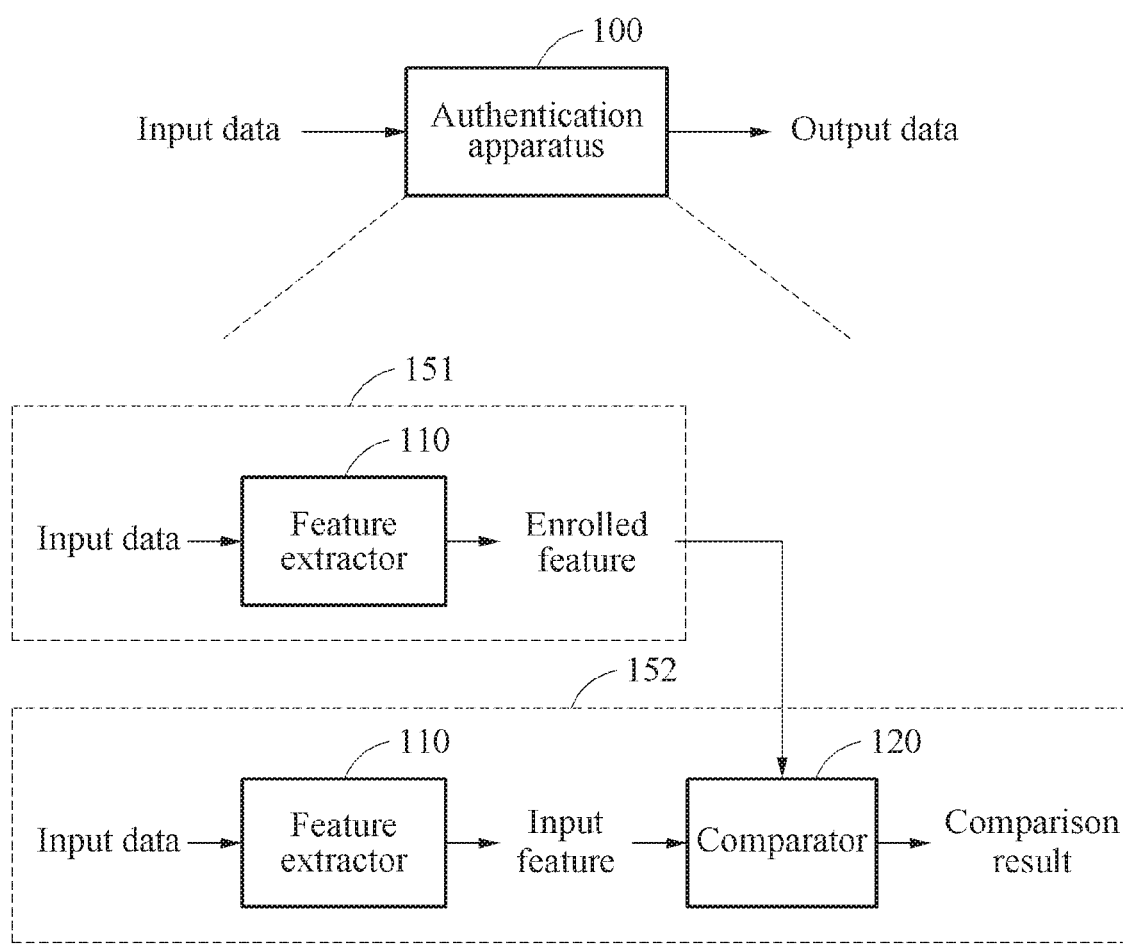
FIG. 1 illustrates an example of an enrollment process and an authentication process in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1 illustrates an example of an enrollment process and an authentication process, in accordance with one or more embodiments.

Referring to FIG. 1, an authentication apparatus 100 receives input data and generates output data by processing the received input data. The input data may correspond to an input voice or speech, or an input image, but is not limited thereto. For example, in an example of speech recognition, the input data may include voice or audio data. In an example of facial recognition, the input data may include a facial image. In an example of fingerprint recognition, the input data may include a fingerprint image. In an example of iris recognition, the input data may include an iris image. The output data may include an authentication result. For example, the authentication result may indicate an authentication success or an authentication failure. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring again to FIG. 1, the authentication apparatus 100 performs an enrollment process 151 and an authentication process 152. The enrollment process 151 is a process where a legitimate user enrolls or registers himself or herself in the authentication apparatus 100, and the authentication process 152 is a process in which a test user attempts an authentication by incorrectly claiming that he or she is a legitimate user.

In a non-limited example, the enrollment process 151 may be performed before the authentication process 152. According to the enrollment process 151, information pertaining to the legitimate user is enrolled or registered in the authentication apparatus 100. The information of the legitimate user enrolled in the authentication apparatus 100 is referred to as enrolled information or an enrolled feature. It may be expressed that the enrolled information is "pre"enrolled.

Here, "pre" means before the authentication process 152. According to the authentication process 152, an authentication is deemed to be successful when the test user corresponds to a legitimate user, and the authentication is deemed to fail when the test user does not correspond to a legitimate user.

In the enrollment process 151, the authentication apparatus 100 extracts at least one feature from the input data using a feature extractor 110, and creates an enrolled feature based on the extracted at least one feature. The authentication apparatus 100 stores the enrolled feature as information of the legitimate user.

In the authentication process 152, the authentication apparatus 100 extracts at least one feature from the input data using the feature extractor 110, and determines an input feature based on the extracted at least one feature. The authentication apparatus 100 compares the enrolled feature and the input feature using a comparator 120, and generates an authentication result based on a comparison result. For example, the comparison result may include a similarity or a difference between the enrolled feature and the input feature, and the authentication apparatus 100 may generate the authentication result by comparing the similarity or the difference between the enrolled feature and the input feature, to a threshold, hereinafter identified as TH1.

The feature extractor 110 and the comparator 120 are each implemented through at least one hardware module, at least one software module, or a combination thereof. For example, the feature extractor 110 and the comparator 120 are each implemented as a neural network. In this example, at least a portion of the neural network is implemented as software, hardware including a neural processor, or a combination thereof. Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

In an example, the neural network may correspond to a deep neural network (DNN) including a fully connected network, a deep convolutional network, and a recurrent neural network, or may include different or overlapping neural network portions respectively with such full, convolutional, or recurrent connections, according to an algorithm used to process information. The DNN includes a plurality of layers. The plurality of layers includes an input layer, at least one hidden layer, and an output layer. For example, the DNN may include an input layer to which input data is applied, an output layer for outputting a result derived through prediction based on training and the input data, and a plurality of hidden layers for performing a neural network operation between the input layer and the output layer.

The neural network may be configured to perform as non-limiting examples, object classification, object recognition, voice recognition, and image recognition by mutually mapping input data and output data having a nonlinear relationship based on deep learning. Such deep learning is indicative of a processor implemented machine learning scheme for solving issues, such as issues related to automated image or speech recognition from a big data set, as non-limiting examples. Deep learning is construed as an optimization problem solving process of finding a point at which energy is minimized while training a neural network using prepared training data. Through supervised or unsupervised learning of deep learning, a structure of the neural network or a weight corresponding to a model is obtained, and the input data and the output data are mapped to each other through the weight.

The neural network is trained based on the training data in a training operation, and performs an inference operation such as classification, recognition, or detection related to the input data in an inference operation. It may be expressed that the neural network is "pre"trained. Here, "pre" means before input data for inference is input into the neural network. That the neural network "starts" means that the neural network is ready for inference. For example, that the neural network "starts" includes that the neural network is loaded into a memory, or that input data for inference is input into the neural network after the neural network is loaded into the memory.

The feature extractor 110 generates a feature vector by extracting at least one feature from the input data. The feature extractor 110 may include a neural network that is pretrained to extract features from a network input. The comparator 120 outputs a comparison result including a similarity or a difference between an input feature vector and an enrolled feature vector. The comparator 120 may include a neural network that is pretrained to output a result of the comparison between the input to the network and the enrolled feature vector.

In the event that a model change or an update related to the authentication apparatus 100 is made, the feature extractor 110 may be changed to another feature extractor. Hereinafter, the feature extractor 110 is referred to as an old feature extractor or a first feature extractor, and the changed feature extractor that is different from the feature extractor 110 is referred to as a new feature extractor or a second feature extractor. For example, the new feature extractor may be an updated version of the old feature extractor. The old feature extractor and the new feature extractor may extract features using different schemes. In this example, it may be difficult to perform the authentication process 152 using an enrolled feature generated through the old feature extractor and an input feature generated through the second feature extractor.

To perform the authentication process 152 based on the new feature extractor, an enrolled feature corresponding to the new feature extractor should be provided. However, the enrollment of a new enrolled feature using the new feature extractor may be inconvenient for users.

In an example, an enrolled feature corresponding to an old or previous enrolled feature extractor is transformed to an enrolled feature corresponding to the new or updated feature extractor based on a transformation model, and the authentication process 152 is performed based on the new enrolled feature. Hereinafter, the term "old enrolled feature" or "first enrolled feature" is used in relation to the old feature extractor or the first feature extractor, and the term "new enrolled feature" or "second enrolled feature" is used in relation to the new feature extractor or the second feature extractor and the transformation model.

Figure 2:
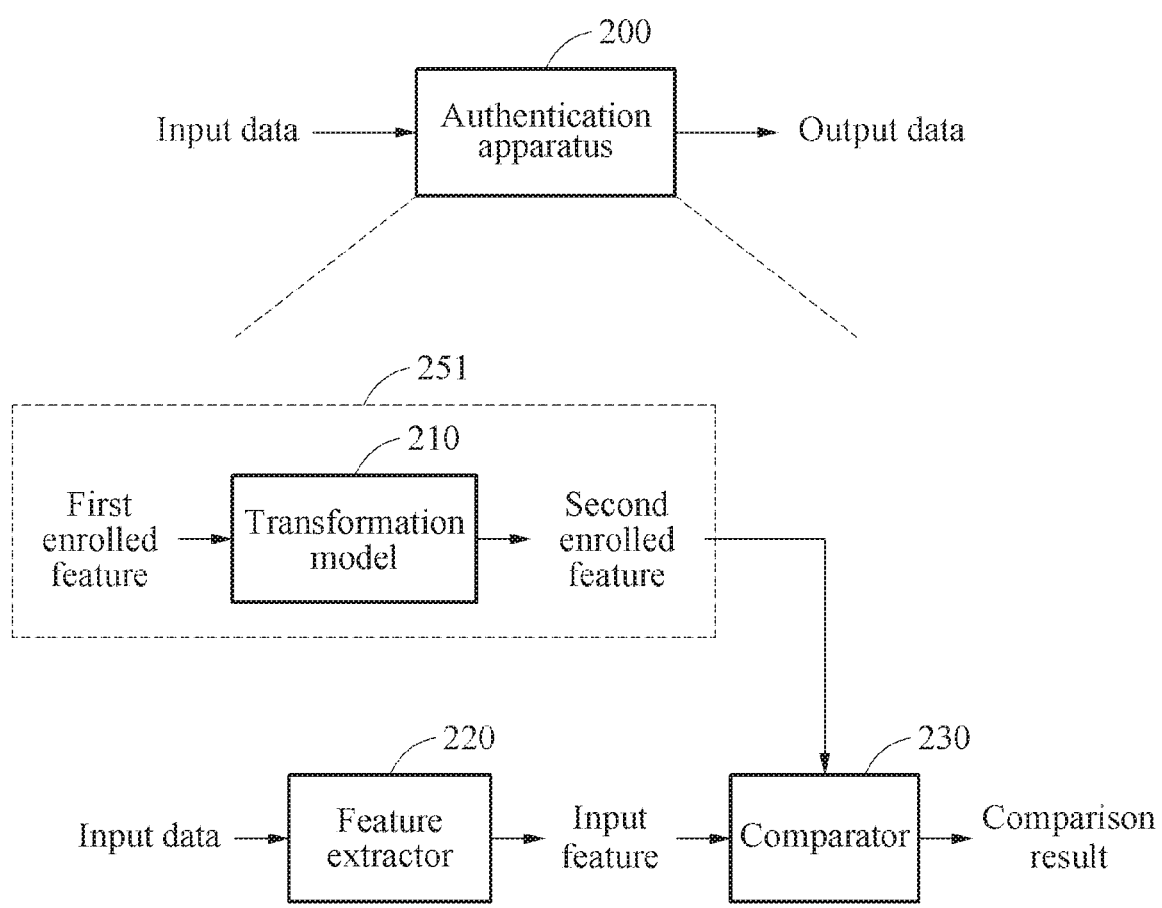
FIG. 2 illustrates an example of an authentication process with a transformation model in accordance with one or more embodiments.

FIG. 2 illustrates an example of an authentication process using a transformation model, in accordance with one or more embodiments.

Referring to FIG. 2, a transformation model 210 transforms a first enrolled feature to a second enrolled feature. The first enrolled feature refers to an old enrolled feature. The first enrolled feature may be a feature enrolled using the feature extractor 110 of FIG. 1 through the enrollment process 151 of FIG. 1. In this example, the first enrolled feature is construed as corresponding to the feature extractor 110 of FIG. 1, and the second enrolled feature is construed as corresponding to a feature extractor 220 of FIG. 2. The feature extractor 220 is an updated version of the feature extractor 110 of FIG. 1.

An authentication apparatus 200 determines an input feature by extracting a feature from input data using the feature extractor 220. For ease of description, the input feature generated based on the feature extractor 110 of FIG. 1 is referred to as a first input feature, and the input feature generated based on the feature extractor 220 is referred to as a second input feature. The authentication apparatus 200 performs an authentication based on the second enrolled feature and the second input feature. For example, the authentication apparatus 200 determines a comparison result by comparing the second enrolled feature and the second input feature using a comparator 230, and generates an authentication result based on the comparison result and a threshold.

The feature extractor 220 and the comparator 230 are each implemented through at least one hardware module, at least one software module, or a combination thereof. For example, the feature extractor 220 and the comparator 230 may each be implemented as a neural network. The description of the neural network of FIG. 1 applies to the feature extractor 220 and the comparator 230 of FIG. 2.

In a non-limiting example transformation process 251 is performed by the authentication apparatus 200. In another example, the transformation process 251 may be implemented by another apparatus different from the authentication apparatus 200. For example, the authentication apparatus 200 includes the transformation model 210, and transforms the first enrolled feature to the second enrolled feature using the transformation model 210. In another example, instead of the authentication apparatus 200, another apparatus may include the transformation model 210. In this example, the other apparatus may transform the first enrolled feature to the second enrolled feature using the transformation model 210, and the authentication apparatus 200 may then receive the second enrolled feature to which the first enrolled feature is transformed from the other apparatus. Thus, in an example, the authentication apparatus 200 may obtain the second enrolled feature from an external apparatus.

Figure 3:
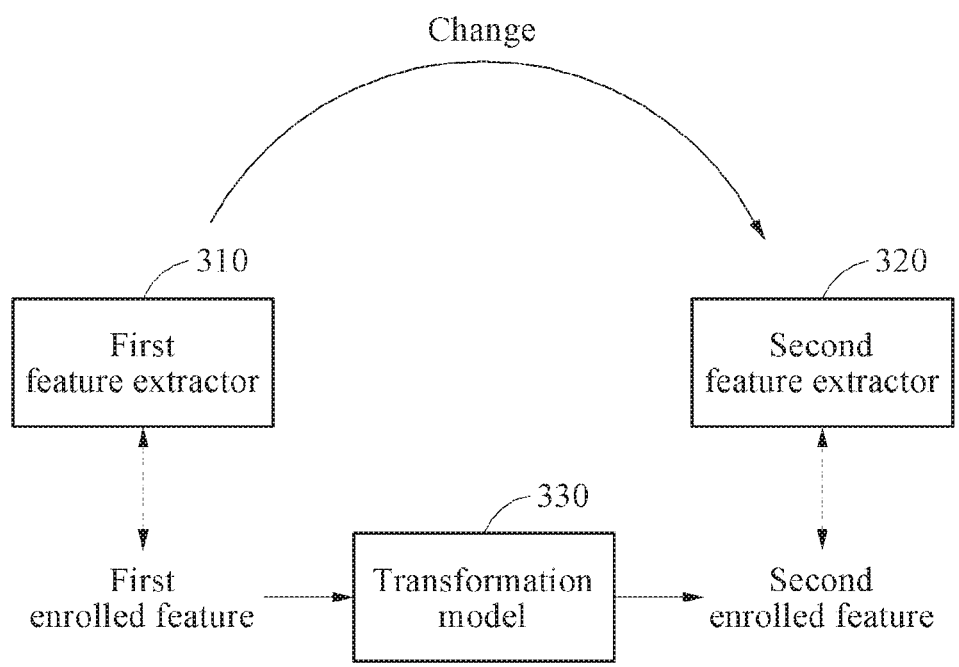
FIG. 3 illustrates an example of an operation of a transformation model in accordance with one or more embodiments.

FIG. 3 illustrates an example of an operation of a transformation model in accordance with one or more embodiments.

Referring to FIG. 3, a transformation model 330 transforms a first enrolled feature corresponding to a first feature extractor 310 to a second enrolled feature corresponding to a second feature extractor 320. The first feature extractor 310 and the second feature extractor 320 are different from each other. For example, the second feature extractor 320 may be a modification of the first feature extractor 310. In detail, the second feature extractor 320 may be an updated version of the first feature extractor 310. The transformation model 330 is generated based on the first feature extractor 310 and the second feature extractor 320.

The transformation model 330 includes structural elements corresponding to differences between a structure of the first feature extractor 310 and a structure of the second feature extractor 320, and transforms the first enrolled feature to the second enrolled feature using the corresponding structural elements. In another example, the transformation model 330 is pretrained to output an output of the second feature extractor 320 when an output of the first feature extractor 310 is input thereinto. Through the training as described above, the transformation model 330 outputs the second enrolled feature in response to an input of the first enrolled feature.

Figure 4:
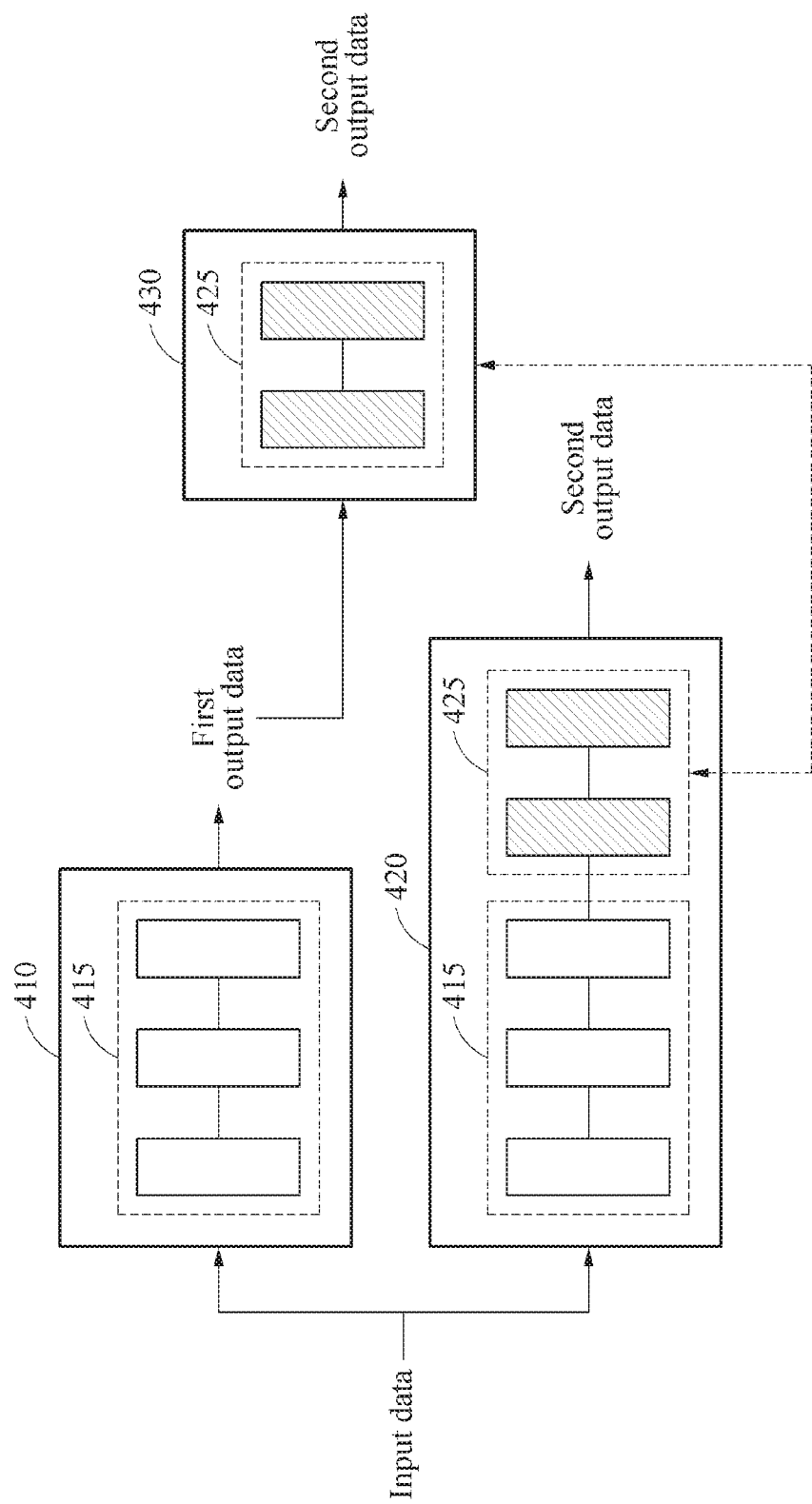
FIG. 4 illustrates an example of generating a transformation model in accordance with one or more embodiments.

FIG. 4 illustrates an example of generating a transformation model. Referring to FIG. 4, a feature extractor 410 includes a plurality of layers 415, and a feature extractor 420 includes the plurality of layers 415 and a plurality of layers 425. In an example, the plurality of layers 415 and 425 correspond to convolutional layers. The feature extractor 410 corresponds to a first feature extractor, and the feature extractor 420 corresponds to a second feature extractor.

For example, the plurality of layers 425 is added to the second feature extractor 420 during a process of updating the first feature extractor 410 to the second feature extractor 420. Structural elements corresponding to differences between a structure of the first feature extractor 410 and a structure of the second feature extractor 420 are the plurality of layers 425. Thus, a transformation model 430 is generated based on the plurality of layers 425. For example, the transformation model 430 is generated to include the plurality of layers 425.

The first feature extractor 410 outputs first output data in response to an input of input data, and the second feature extractor 420 outputs second output data in response to an input of the input data. The transformation model 430 outputs the second output data in response to an input of the first output data. The first output data is output based on the plurality of layers 415, and the second output data is output based on a combination of the plurality of layers 415 and the plurality of layers 425. Thus, the first output data is transformed to the second output data through the plurality of layers 425 of the transformation model 430.

The first output data and the second output data correspond to the first enrolled feature and the second enrolled feature of FIG. 3. Thus, the transformation model 430 transforms the first enrolled feature to the second enrolled feature based on the structural elements corresponding to the differences between the structure of the first feature extractor 410 and the structure of the second feature extractor 420.

Figure 5:
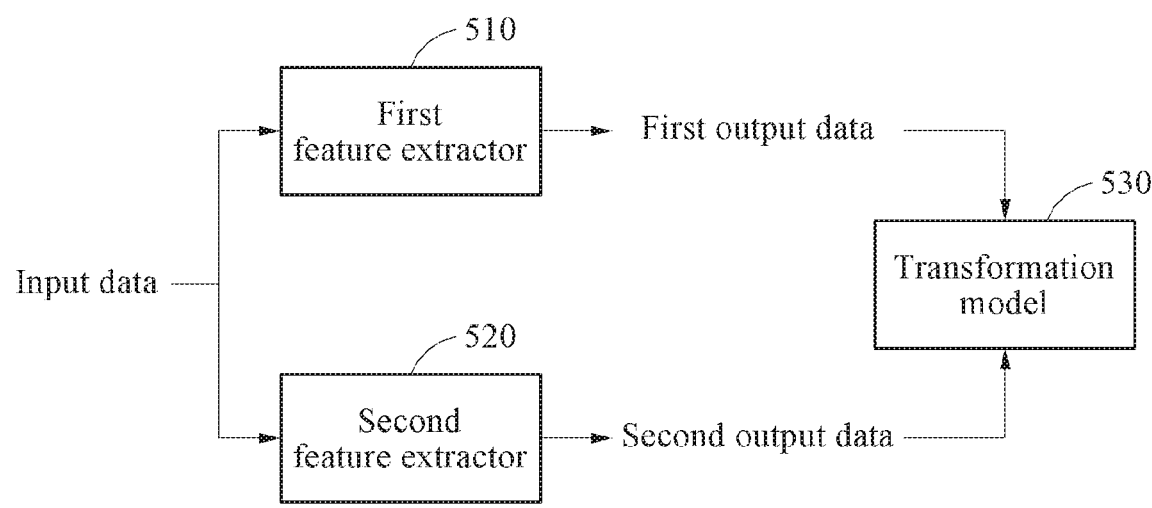
FIG. 5 illustrates an example of generating a transformation model in accordance with one or more embodiments.

FIG. 5 illustrates an example of generating a transformation model. Referring to FIG. 5, a transformation model 530 is trained based on respective outputs of a feature extractor 510 and a feature extractor 520 with respect to the same input. The feature extractor 510 corresponds to a first feature extractor, and the feature extractor 520 corresponds to a second feature extractor. For example, the first feature extractor 510 outputs first output data in response to an input of input data, and the second feature extractor 520 outputs second output data in response to an input of the same input data. The transformation model 530 is trained to output the second output data in response to an input of the first output data. The first output data and the second output data correspond to the first enrolled feature and the second enrolled feature of FIG. 3. Thus, the transformation model 530 transforms the first enrolled feature to the second enrolled feature based on training as described above.

Figure 6:
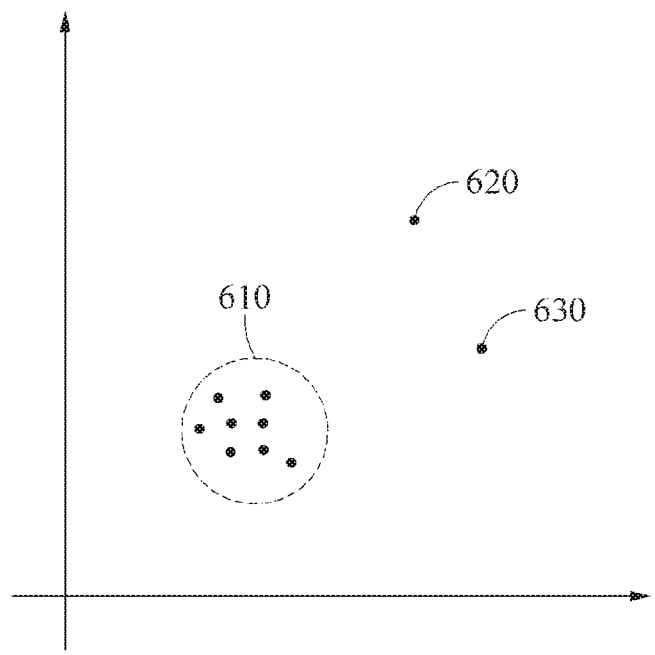
FIG. 6 illustrates an example of second sub-enrolled features in accordance with one or more embodiments.

FIG. 6 illustrates an example of second sub-enrolled features in accordance with one or more embodiments. An enrolled feature includes sub-enrolled features. The sub-enrolled features may be determined through a single enrollment process, or may be determined through a plurality of enrollment processes. For example, in an example of face recognition, sub-enrolled features corresponding to respective parts of a face may be determined based on a single facial image or a plurality of facial images captured in an enrollment process.

A first enrolled feature includes first sub-enrolled features, and an authentication apparatus transforms the first sub-enrolled features to second sub-enrolled features using a transformation model. The second sub-enrolled features constitute a second enrolled feature. The authentication apparatus determines whether the second sub-enrolled features include an inappropriate sub-enrolled feature in order to prevent a false acceptance. The false acceptance may include the incorrect recognition of a test user who is not a legitimate user as being a legitimate user. The authentication apparatus determines suitabilities or similarities of the second sub-enrolled features to the first sub-enrolled features, or similarities between one second sub-enrolled feature and the remaining second sub-enrolled features, and discards at least a portion of the second sub-enrolled features based on the determined suitabilities or similarities of the second sub-enrolled features to the first sub-enrolled features, or determined similarities between one second sub-enrolled feature and the remaining second sub-enrolled features.

In FIG. 6, the indicated points are vectors corresponding to the second sub-enrolled features represented on a predetermined coordinate plane. The second sub-enrolled features are classified as second sub-enrolled features 610 forming a cluster and as second sub-enrolled features 620 and 630 corresponding to outliers. The authentication apparatus calculates suitabilities or similarities of the second sub-enrolled features 620 and 630 corresponding to the outliers to be relatively low, and configures a second enrolled feature by excluding the second sub-enrolled features 620 and 630.

The authentication apparatus discards at least a portion of the second sub-enrolled features based on a similarity of the second sub-enrolled features. For example, the authentication apparatus discards one of the second sub-enrolled features based on a threshold, hereinafter, identified as TH2, and similarities between the one second sub-enrolled feature and the remaining second sub-enrolled features.

A similarity parameter related to each second sub-enrolled feature is determined based on Equation 1 below.

$$T(k) = \frac{1}{N-1} \sum_{j=1, j \neq k}^{N} \text{Similarity}(b_k, b_j) \quad \text{Equation 1}$$

In Equation 1, T(k) denotes a similarity parameter related to a second sub-enrolled feature corresponding to an index k, N denotes a total number of second sub-enrolled features, and Similarity($b_k$, $b_j$) denotes a similarity between a second sub-enrolled feature $b_k$ and a second sub-enrolled feature $b_j$. For example, Similarity($b_k$, $b_j$) is determined based on a distance or a difference between the second sub-enrolled feature $b_k$ and the second sub-enrolled feature $b_j$. Similarity ($b_k$, $b_j$) has a relatively large value as the distance between the second sub-enrolled feature $b_k$ and the second sub-enrolled feature $b_j$ decreases. A sum of Similarity($b_k$, $b_j$) values is divided by N−1, and thus the similarity parameter is also referred to as a normalized similarity.

The authentication apparatus determines the similarity parameter related to each second sub-enrolled feature based on Equation 1, and discards at least a portion of the second sub-enrolled features based on the threshold TH2 and the similarity parameter. For example, the authentication apparatus excludes a second sub-enrolled feature having a similarity parameter less than the threshold TH2.

In an example, the threshold TH2 is equal to a threshold, hereinafter, identified as TH1, used in an authentication process. For example, the authentication apparatus performs an authentication based on the threshold TH1 and a similarity between a second enrolled feature and a second input feature. The second enrolled feature is an enrolled feature to which the first enrolled feature is transformed by a transformation model, and the second input feature is extracted from input data using a second feature extractor. However, examples are not limited thereto. The threshold TH2 may have various values different from the threshold TH1.

A transformation process is performed by various devices. FIGS. 7 through 10 illustrate various examples of a transformation operation. A transformation of an enrolled feature may also be implemented through various examples other than the examples set forth hereinafter with reference to FIGS. 7 through 10. A user terminal 700 of FIG. 7, a user terminal 820 of FIG. 8, Internet of things (IoT) terminals 920, 930, and 940 of FIG. 9, and IoT terminals 1020, 1030, and 1040 of FIG. 10 each include the authentication apparatus described with reference to FIGS. 1 through 6, or perform the functions of the authentication apparatus described with reference to FIGS. 1 through 6.

Figure 7:
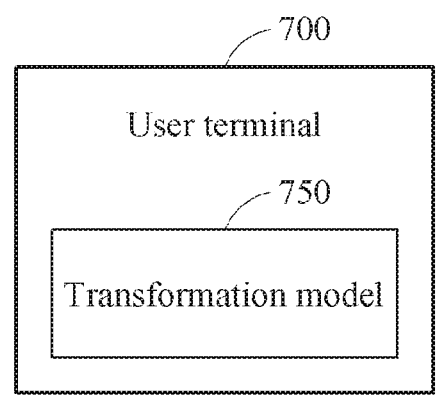
FIG. 7 illustrates an example of a transformation operation of a user terminal in accordance with one or more embodiments.

FIG. 7 illustrates an example of a transformation operation of a user terminal in accordance with one or more embodiments.

Referring to FIG. 7, the user terminal 700 includes a transformation model 750. The user terminal 700 transforms a first enrolled feature to a second enrolled feature using the transformation model 750. The transformation model 750 may be generated by the user terminal 700, or may be generated by another apparatus different from the user terminal 700, for example, a server. The user terminal 700 performs an authentication process based on the second enrolled feature.

Figure 8:
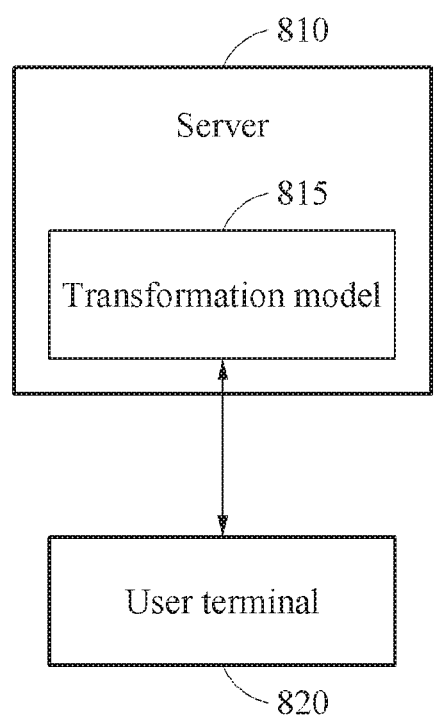
FIG. 8 illustrates an example of a transformation operation through a server in accordance with one or more embodiments.

FIG. 8 illustrates an example of a transformation operation that is performed through a server in accordance with one or more embodiments.

Referring to FIG. 8, a server 810 includes a transformation model 815, and the user terminal 820 transforms a first enrolled feature to a second enrolled feature using the transformation model 815 in the server 810. For example, the user terminal 820 transmits the first enrolled feature to the server 810, and the server 810 transforms the first enrolled feature to the second enrolled feature using the transformation model 815 and transmits the second enrolled feature to the user terminal 820. The transformation model 815 is generated by the server 810. The user terminal 820 performs an authentication process based on the second enrolled feature.

Figure 9:
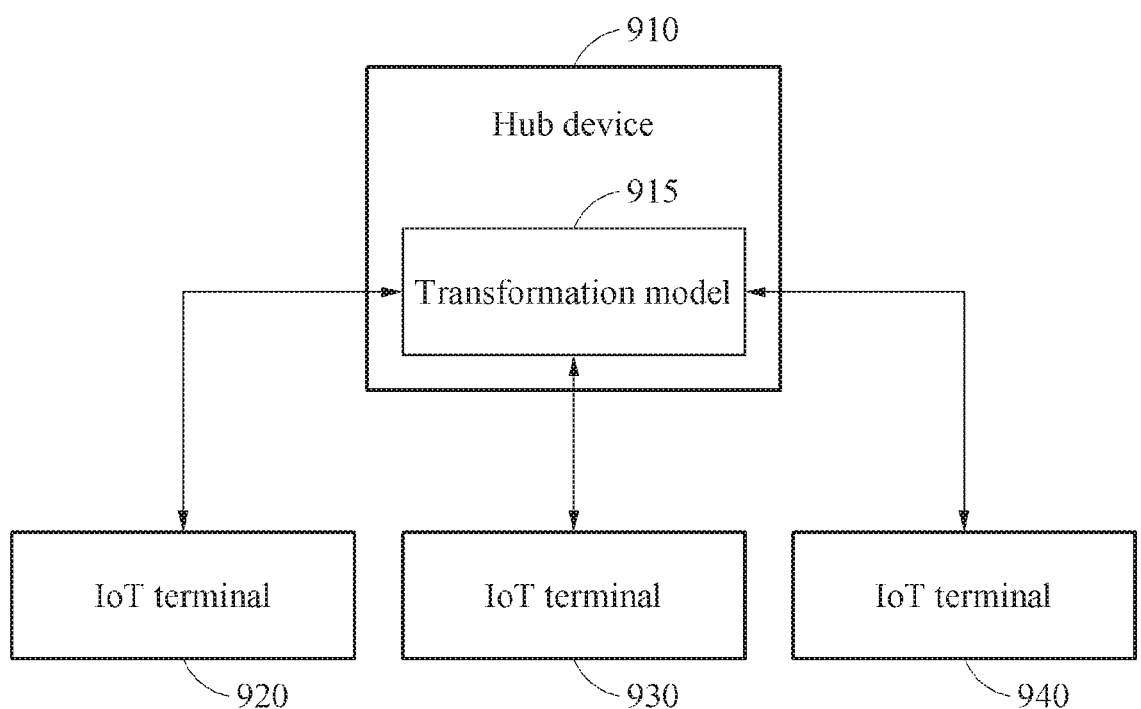
FIG. 9 illustrates an example of a transformation operation through a hub device in an Internet of things (IoT) system in accordance with one or more embodiments.

FIG. 9 illustrates an example of a transformation operation that is performed through a hub device in an IoT system in accordance with one or more embodiments.

Referring to FIG. 9, a hub device 910 includes a transformation model 915, and the IoT terminals 920, 930, and 940. The IoT terminals 920, 930, and 940 each transform an old enrolled feature to a new enrolled feature using the transformation model 915 in the hub device 910. For example, the IoT terminals 920, 930, and 940 transmit the old enrolled features to the hub device 910, and the hub device 910 transforms the old enrolled features to new enrolled features using the transformation model 915 and transmits the new enrolled features to the respective IoT terminals 920, 930, and 940. The transformation model 915 may be generated by the hub device 910, or may be generated by another apparatus different from the hub device 910, for example, a server. The IoT terminals 920, 930, and 940 may each perform an authentication process based on the corresponding new enrolled feature.

Figure 10:
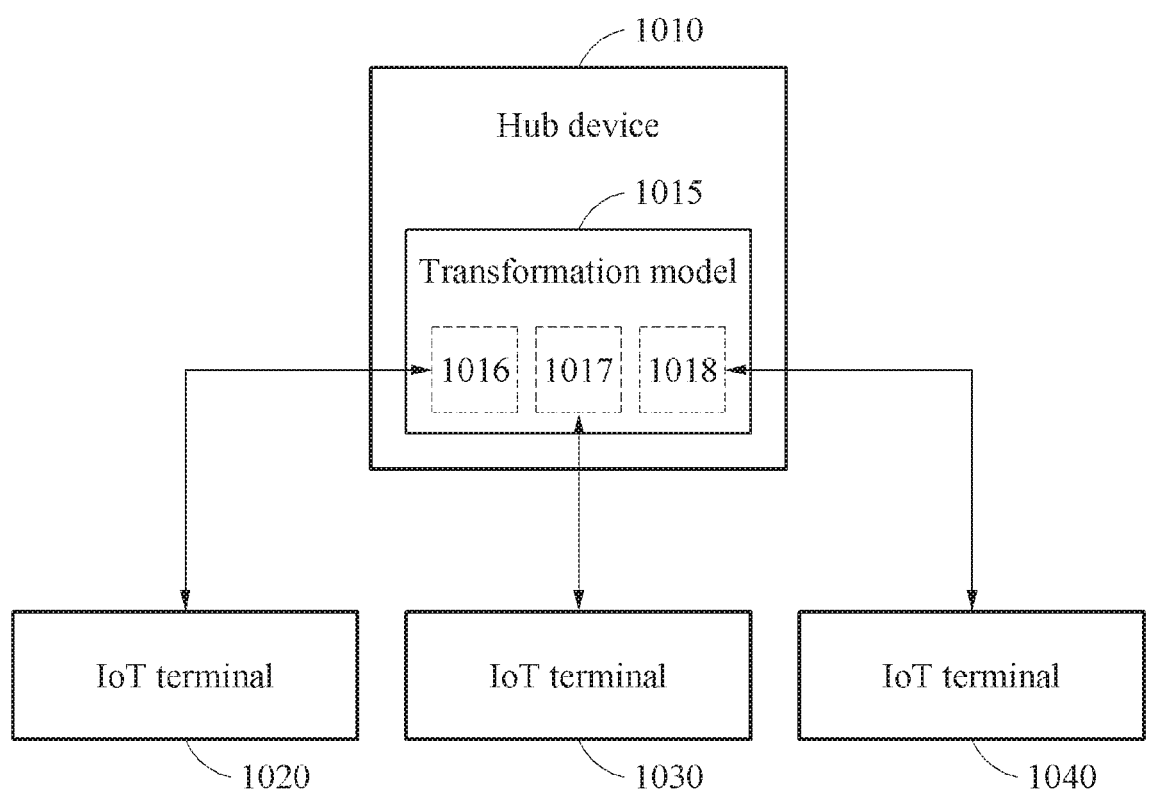
FIG. 10 illustrates an example of a transformation operation through a hub device in an IoT system in accordance with one or more embodiments.

FIG. 10 illustrates an example of a transformation operation through a hub device in an IoT system in accordance with one or more embodiments.

Referring to FIG. 10, a hub device 1010 includes a transformation model 1015. The transformation model 1015 includes, as non-limited examples, a first sub-transformation model 1016, a second sub-transformation model 1017, and a third sub-transformation model 1018. The first sub-transformation model 1016 transforms a first enrolled feature to a second enrolled feature, the second sub-transformation model 1017 transforms the first enrolled feature to a third enrolled feature, and the third sub-transformation model 1018 transforms the first enrolled feature to a fourth enrolled feature.

The first enrolled feature corresponds to a first feature extractor used by the hub device 1010, the second enrolled feature corresponds to a second feature extractor used by the IoT terminal 1020, the third enrolled feature corresponds to a third feature extractor used by the IoT terminal 1030, and the fourth enrolled feature corresponds to a fourth feature extractor used by the IoT terminal 1040. In an example, the first feature extractor may also be used by another representation device of the IoT system. The first sub-transformation model 1016 is generated based on the first feature extractor and the second feature extractor, the second sub-transformation model 1017 is generated based on the first feature extractor and the third feature extractor, and the third sub-transformation model 1018 is generated based on the first feature extractor and the fourth feature extractor. Contrary to the definitions provided above, in FIG. 10, the first enrolled feature is referred to as a source enrolled feature which is a feature enrolled through the hub device 1010 or a representative device, and the second enrolled feature, the third enrolled feature, and the fourth enrolled feature are referred to as individual enrolled features which are enrolled features used respectively by the IoT terminals 1020, 1030, and 1040.

The hub device 1010 separately transforms the first enrolled feature to the second enrolled feature, the third enrolled feature, and the fourth enrolled feature using the transformation model 1015, and respectively transmits the second enrolled feature, the third enrolled feature, and the fourth enrolled feature to the respective IoT terminals 1010, 1020, and 1030. The transformation model 1015 may be generated by the hub device 1010, or may be generated by another apparatus different from the hub device 1010, for example, a server. The IoT terminals 1010, 1020, and 1030 perform authentication processes based on the second enrolled feature, the third enrolled feature, and the fourth enrolled feature.

Figure 11:
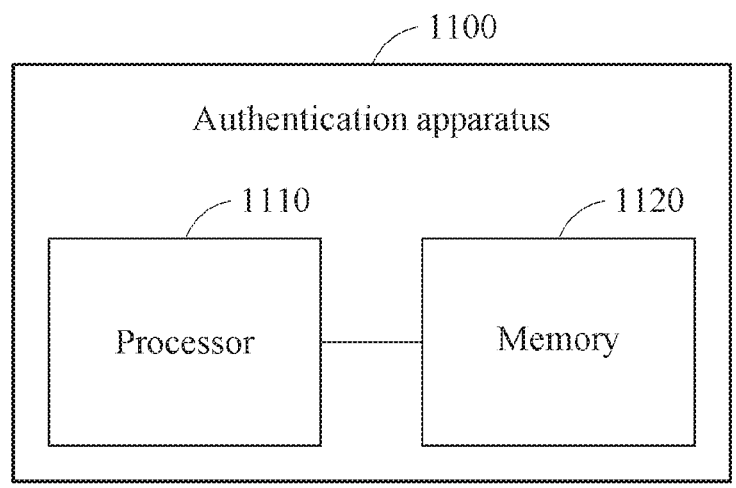
FIG. 11 illustrates an example of a configuration of an authentication apparatus in accordance with one or more embodiments.

FIG. 11 illustrates an example of a configuration of an authentication apparatus in accordance with one or more embodiments.

Referring to FIG. 11, an authentication apparatus 1100 includes a processor 1110 and a memory 1120. In an example, the authentication apparatus 1100 may further store instructions, e.g., in memory 1120, which when executed by the processor 1110 configure the processor 1110 to implement one or more or any combination of operations herein. The processor 1110 and the memory 1120 may be respectively representative of one or more processors 1110 and one or more memories 120.

The authentication apparatus 1100 performs the at least one operation described or illustrated herein in relation to an authentication, and provides an authentication result to a user. The memory 1120 is connected to the processor 1110, and stores instructions executable by the processor 1110, data to be calculated by the processor 1110, or data processed by the processor 1110. The memory 1120 includes a non-transitory computer readable medium, for example, a high-speed random access memory, and/or a non-volatile computer readable storage medium, for example, at least one disk storage device, flash memory device, or other non-volatile solid state memory devices.

The processor 1110 executes instructions to perform the at least one operation described with reference to FIGS. 1 through 10. For example, the processor 1110 obtains a second enrolled feature to which a first enrolled feature generated based on a first feature extractor is transformed, determines an input feature by extracting a feature from input data using a second feature extractor different from the first feature extractor, and performs an authentication based on the second enrolled feature and the input feature.

Figure 12:
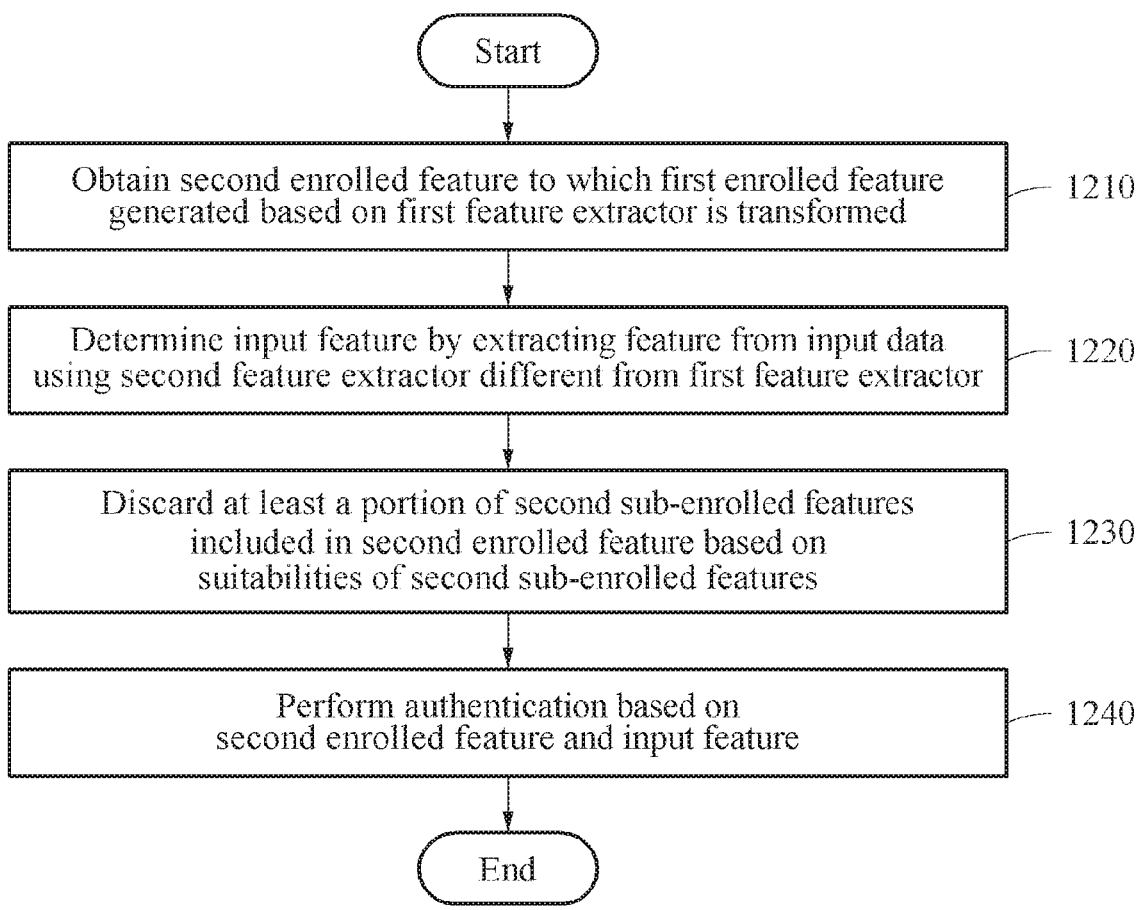
FIG. 12 illustrates an example of an authentication method in accordance with one or more embodiments.

FIG. 12 illustrates an example of an authentication method in accordance with one or more embodiments. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware and computer instructions. In addition to the description of FIG. 12 below, the descriptions of FIGS. 1-11 are also applicable to FIG. 12, and are incorporated herein by reference. Thus, the above description may not be repeated here.

Referring to FIG. 12, in operation 1210, an authentication apparatus obtains a second enrolled feature to which a first enrolled feature generated based on a first feature extractor is transformed. In operation 1220, the authentication apparatus determines an input feature by extracting a feature from input data using a second feature extractor different from the first feature extractor. In operation 1230, the authentication apparatus discards at least a portion of second sub-enrolled features included in the second enrolled feature based on suitabilities or similarities of the second sub-enrolled features. In operation 1240, the authentication apparatus performs an authentication based on the second enrolled feature and the input feature. In addition, the description provided with reference to FIGS. 1 through 10 applies to the authentication method.

The authentication apparatuses 100, 200, and 1100, the feature extractor 110, the comparator 120, transformation model 210, feature extractor 220, comparator 230, first extractor 310, second extractor 320, transformation model 330, feature extractor 410, feature 420, transformation model 430, first feature extractor 510, second feature extractor 520, transformation model 530, user terminal 700, transformation model 750, server 810, transformation model 15, user terminal 820, hub device 910, transformation 915, IoT terminals 920, 930, and 940, hub device 1010, IoT terminals 1029, 1030, and 1040, authentication apparatus 1100, processor 1110, and memory 1120, and other apparatuses, units, modules, devices, and other components described herein with respect to FIGS. 1-12 are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented authentication method, comprising:
   obtaining a second enrolled feature, the second enrolled feature having been generated by transforming a first enrolled feature to the second enrolled feature, the first enrolled feature having been extracted from a first input data by a first feature extractor comprising a first neural network;
   determining an input feature by extracting a feature from a second input data with a second feature extractor comprising a second neural network different from the first neural network; and
   performing an authentication based on the second enrolled feature and the input feature.

2. The method of claim 1, the transforming having been performed with a transformation model, the transformation model corresponding to a difference between the first neural network and the second neural network.

3. The method of claim 1, wherein the second enrolled feature is received from an apparatus other than an apparatus that performs the authentication.

4. The method of claim 1, wherein the second feature extractor is an updated version of the first feature extractor.

5. The method of claim 1, wherein the second enrolled feature is obtained based on a transformation model.

6. The method of claim 5, wherein the transformation model includes a structural element that corresponds to a structural difference between the first neural network and the second neural network.

7. The method of claim 5, wherein the first neural network is pretrained to output first features for use with a first authentication procedure, wherein the second neural network is pretrained to output second features for a second authentication procedure, and wherein the transformation model is a neural network pretrained to transform features for use with the first authentication procedure to features for use with the second authentication procedure.

8. The method of claim 1, wherein the first enrolled feature includes first sub features, and the second enrolled feature includes second sub-features to which the first sub features are respectively transformed.

9. The method of claim 8, further comprising:
   discarding at least a portion of the second sub features based on similarity measures of the second sub features with respect to each other.

10. The method of claim 9, wherein the discarding comprises discarding at least one of the second sub features based on a similarity measure between the at least one of the second sub-features and an aggregate similarity of other of the second sub features.

11. The method of claim 10, wherein the performing the authentication is based on a first threshold and a similarity between the second enrolled feature and the input feature, and
   wherein the first threshold is equal to a second threshold based upon which the at least one of the second sub-features is discarded.

12. An authentication apparatus comprising:
   one or more processors configured to:
      obtain a second enrolled feature transformed from a first enrolled feature, wherein the first enrolled feature was extracted from an enrollment image based on a first feature extractor comprising a first neural network;
      extract an input feature from an authentication image with a second feature extractor comprising a second neural network, wherein the first enrolled feature is transformed to the second enrolled feature based on a difference between the first neural network and the second neural network; and
      perform an authentication based on the second enrolled feature and the input feature.

13. The apparatus of claim 12, wherein the first enrolled feature is transformed to the second enrolled feature based on a transformation model that corresponds to the difference between the first neural network and the second neural network.

14. The apparatus of claim 13, wherein the transformation model includes a structural element that is not a structural element of the first feature extractor and is a structural element of the second feature extractor.

15. The apparatus of claim 13, wherein the first feature extractor neural network is pretrained to output first features for use with a first authentication procedure, wherein the second neural network is pretrained to output second features for a second authentication procedure, and wherein the transformation model is a neural network pretrained to transform features for use with the first authentication procedure to features for use with the second authentication procedure.

16. The apparatus of claim 12, wherein the first enrolled feature includes first sub features, and the second enrolled feature includes second sub-features to which the first sub features are transformed.

17. The apparatus of claim 16, wherein the one or more processors are configured to discard at least a portion of the second sub features based on a similarity between the second sub features.

18. The apparatus of claim 17, wherein the one or more processors are configured to discard one of the second sub features based on a threshold and similarities between the one second sub feature and the remaining second sub features.

19. The apparatus of claim 12, further comprising a memory storing instructions that, when executed by the one or more processors, configure the one or more processors to perform the extracting of the first enrolled feature, the obtaining of the second enrolled feature, the extracting of the input feature, and the performing of the authentication.

20. A method performed by a computing device, the method comprising:
   extracting a first enrollment feature set from an enrollment image using a first feature extraction model, and storing the first enrollment feature set;
   using the first feature extraction model to extract a first authentication feature set from a first authentication image and performing a first authentication based on the stored first enrollment feature set and the first authentication feature set;
   using a second feature extraction model to extract a second feature set from a second authentication image;
   transforming the stored first enrollment feature set to a second enrollment feature set based on a transformation model that corresponds to difference between the first feature extraction model and the second feature extraction model; and
   performing a second authentication based on the second enrollment feature set and the second authentication feature set.

* * * * *